US011589444B2

(12) United States Patent
Murano et al.

(10) Patent No.: US 11,589,444 B2
(45) Date of Patent: Feb. 21, 2023

(54) APPARATUSES AND METHODS FOR ILLUMINATING OBJECTS

(71) Applicant: Politecnico di Milano, Milan (IT)

(72) Inventors: Francesco Murano, Milan (IT); Manuela Celi, Milan (IT)

(73) Assignee: Politecnico di Milano, Milan (IT)

( * ) Notice: Subject to any disclaimer, the term of this patent is extended or adjusted under 35 U.S.C. 154(b) by 247 days.

(21) Appl. No.: 16/638,716

(22) PCT Filed: Jul. 27, 2018

(86) PCT No.: PCT/IB2018/055619
§ 371 (c)(1),
(2) Date: Feb. 12, 2020

(87) PCT Pub. No.: WO2019/038611
PCT Pub. Date: Feb. 28, 2019

(65) Prior Publication Data
US 2020/0396360 A1    Dec. 17, 2020

(30) Foreign Application Priority Data
Aug. 22, 2017   (IT) .................. 102017000094994

(51) Int. Cl.
H04N 5/225     (2006.01)
H05B 47/155    (2020.01)
(Continued)

(52) U.S. Cl.
CPC ........... H05B 47/125 (2020.01); G06T 3/005 (2013.01); G06T 7/12 (2017.01); H04N 5/2256 (2013.01);
(Continued)

(58) Field of Classification Search
CPC ......... G06T 3/005; G06T 7/12; H04N 5/2256; H05B 47/125; H05B 45/20; H05B 47/11; H05B 47/155; Y02B 20/40
See application file for complete search history.

(56) References Cited

U.S. PATENT DOCUMENTS 5,142,592 A * 8/1992 Moler ................. G06T 7/12
                                                  382/203
2011/0050883 A1* 3/2011 Ghose .............. G06V 10/25
                                                  348/113
(Continued)

FOREIGN PATENT DOCUMENTS

CN     203259184 U    10/2013
EP       2364013 A2    9/2011
(Continued)

OTHER PUBLICATIONS

International Search Report and Written Opinion of the International Searching Authority, dated Oct. 15, 2018, in corresponding International Application No. PCT/IB2018/055619, 13 pages.
J. Canny, "A Computational Approach to Edge Detection", IEEE Transactions on Pattern Analysis and Machine Intelligence, vol. PAMI-8, No. 6, Nov. 1986, 20 pages.

Primary Examiner — Tracie Y Green
(74) Attorney, Agent, or Firm — MH2 TECHNOLOGY LAW GROUP LLP

(57) ABSTRACT

An apparatus for illuminating objects nay include: an imaging device configured to capture an image of an area and to generate a first signal representative of the captured image, wherein the imaging device is further configured to be activated to capture the image of the area under uniform illumination; a processing unit configured to receive the first signal; process the first signal to identify one or more shapes bounded by edges in an acquired image; and process the acquired image by filling each of the identified one or more shapes with a first color, and by filling parts of the acquired it age external to the edges with a second color, to generate (Continued)

a second signal representative of the processed image; and an image projection device configured to receive the second signal; generate a light beam representative of the processed image; and direct the light beam to the area.

17 Claims, 2 Drawing Sheets

(51) Int. Cl.
*H05B 47/11* (2020.01)
*H05B 47/125* (2020.01)
*H05B 45/20* (2020.01)
*G06T 7/12* (2017.01)
*G06T 3/00* (2006.01)

(52) U.S. Cl.
CPC ............ *H05B 45/20* (2020.01); *H05B 47/11* (2020.01); *H05B 47/155* (2020.01)

(56) References Cited

U.S. PATENT DOCUMENTS

| | | |
|---|---|---|
| 2011/0115910 A1 | 5/2011 | Brackney |
| 2011/0216236 A1* | 9/2011 | Kasahara ............... G03B 17/54 348/370 |
| 2015/0036023 A1* | 2/2015 | Gilbert ................. H04N 9/3176 348/234 |
| 2015/0168821 A1* | 6/2015 | Negretti ............... H05B 47/115 353/85 |

FOREIGN PATENT DOCUMENTS

| | | | | |
|---|---|---|---|---|
| EP | 2466541 A2 * | 6/2012 | ............... | G06K 9/00 |
| KR | 1020130122317 A | 11/2013 | | |
| WO | 2013138148 A1 | 9/2013 | | |
| WO | 2014009277 A1 | 1/2014 | | |

* cited by examiner

APPARATUSES AND METHODS FOR ILLUMINATING OBJECTS

CROSS-REFERENCE TO RELATED APPLICATION(S)

This application is a national stage entry from International Application No. PCT/IB2018/055619, filed on Jul. 27, 2018, in the Receiving Office ("RO/IB") of the International Bureau of the World Intellectual Property Organization ("WIPO"), published as International Publication No. WO 2019/038611 A1 on Feb. 28, 2019; International Application No. PCT/IB2018/055619 claims priority under 35 U.S.C. § 119 from Italian Patent Application No. 102017000094994, filed on Aug. 22, 2017, in the Italian Patent and Trademark Office ("IPTO"); the entire contents of all of these applications are incorporated herein by reference.

FIELD OF THE INVENTION

The present invention relates to an apparatus and a method for illuminating objects. The present invention finds particular application in the illumination of art exhibitions, museums and works in general.

Discussion of the Related Art

Prior art illumination systems are composed of pluralities of light sources arranged in a predetermined position and with a predetermined orientation according to the position, shape and size of the objects to be illuminated.

A first example of a known illumination system is disclosed in CN203259184U. This document discloses a smart monitoring and illuminating system, comprising a digital video camera which is designed to capture images of a real-time environment and an illuminating controller that provides an on/off control on an illuminating lamp. Particularly, the system is used to monitor accesses to an environment through a door that can be opened or closed, thereby modifying the image captured by the camera and accordingly cause the lamp to be turned on and off.

A second example of a known illumination system is disclosed in KR20130122317. This document discloses an illumination system that comprises a security video camera which captures images of a zone to be monitored and an illumination controller that can move an image projection device in response to the movements of the objects being filmed by the camera.

The above discussed systems can control the actuation and movement of an image projection device according to the images that are being captured by a video camera. Nevertheless, they are not able to illuminate the monitored area according to the fixed or moving objects located therein, their shape and/or distance, as the illumination configuration is predetermined and can only be manually changed.

This problem is particularly relevant in art exhibition illumination systems, whose spotlights are manually moved by illumination operators according to the position, size of the works and of the information totems on the walls.

Whenever a work is removed or replaced with another work, the operators are required to change the configuration of the illumination systems to adjust work illumination to prevent illumination of areas in which no work is present, as it often occurs.

Therefore, there is generally the need to be able to automatically adjust the configuration of the illumination devices in response to changes concerning the presence, position and size of the objects arranged in an area designed to be illuminated by said illumination devices.

SUMMARY OF THE INVENTION

One object of the present invention is to provide an apparatus and a method for illuminating objects that can automatically adapt the illumination configuration according to the objects that are to be actually illuminated by the illumination device.

This and other objects are achieved by a system or a method for supplying a railroad path as claimed in any of the appended claims.

A first embodiment of the invention comprises an apparatus for illuminating objects arranged in an area.

The apparatus comprises an imaging device configured to capture an image of the area and generate a first signal representative of the captured image.

A processing unit is in signal communication with the imaging device and is configured to receive the first signal. Thus, the first signal is processed by an image recognition and edge detection algorithm to identify one or more shapes delimited by edges, in the image that has been captured.

The processing unit processes the captured image by applying a first color inside the edge of each identified shape and a second color outside the edge of each identified shape. The processing unit generates a second signal representative of the processed image.

The apparatus further comprises an image projection device, in signal communication with the processing unit and configured to receive the second signals and generate a light beam representative of the processed image. Then, the image projection device directs the light beam to the area.

A second embodiment of the invention comprises a method for illuminating objects arranged in an area. This method comprises a step of capturing an image of the area.

The image is processed using an image recognition and edge detection algorithm to identify one or more shapes bounded by edges.

A first color is applied inside the edge of each identified shape. Similarly, a second color is applied outside the edges of the identified shapes.

Then, a light beam representative of the processed image is generated. Such beam is directed to the area to be illuminated.

The invention solves the above discussed technical problem. Both to the apparatus and method of the invention are able to recognize the areas with objects to be illuminated, such as paintings, and to identify their shapes on a captured image. The use of an image projection devices can clearly illuminate only these zones.

Furthermore, advantageously, the apparatus and the method of the invention are able to easily adapt the illumination to the changing arrangement of the objects to be illuminated. For this, the above described procedure will be simply repeated, with no part having to be physically displaced.

BRIEF DESCRIPTION OF THE DRAWINGS

The characteristics and advantages of the present invention will result from the following detailed description of a possible embodiment, illustrated as a non-limiting example in the annexed drawings, in which.

DETAILED DESCRIPTION

Figure 1:
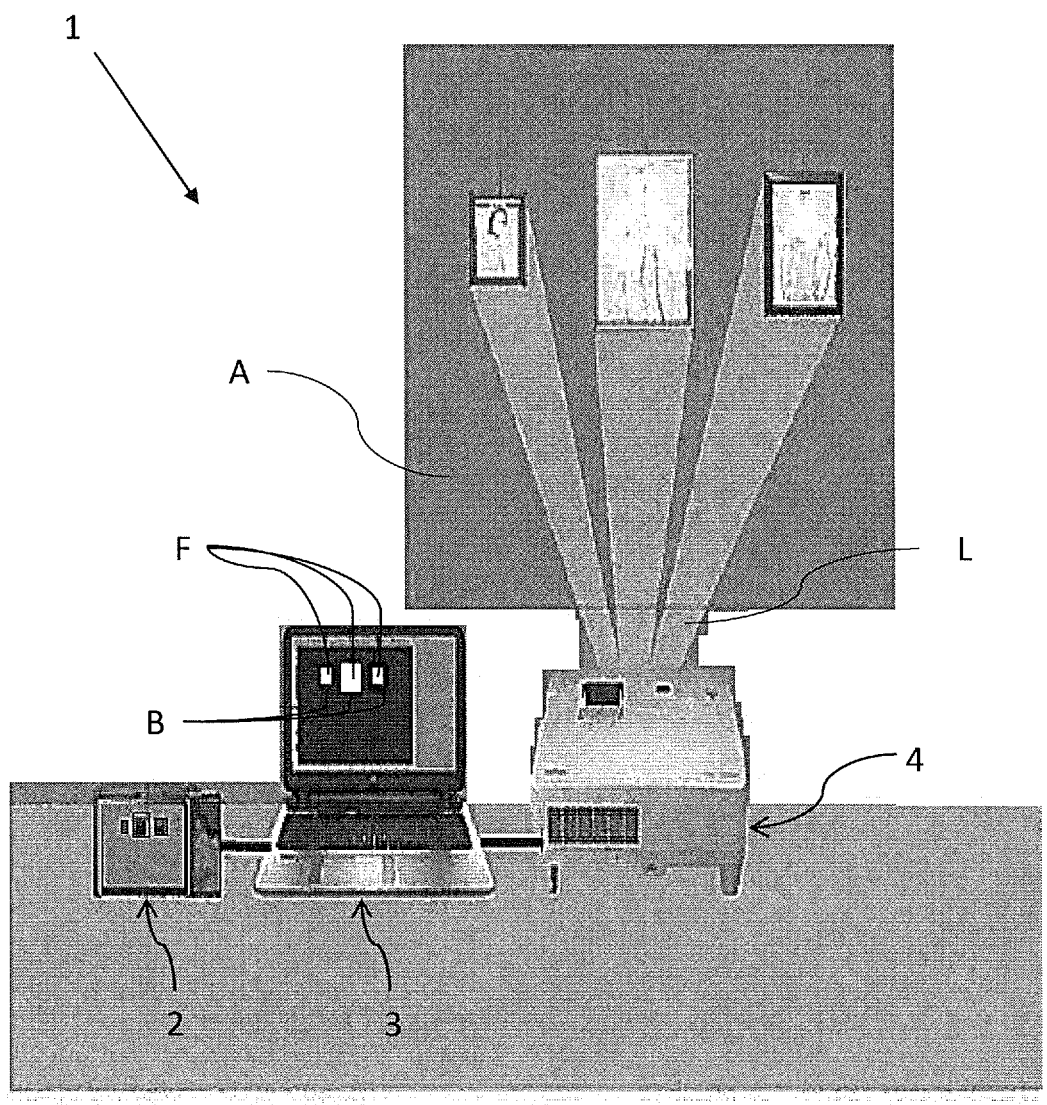
FIG. 1 shows a schematic view of an apparatus for illuminating objects according to the present invention.

Referring to the annexed figures, numeral 1 generally designates an apparatus for illuminating objects arranged in an area according to the present invention.

The apparatus 1 comprises an imaging device 2. Such an imaging device 2 is configured to capture an image of an area "A" and generate a first signal "IM" representative of the captured image. By mere way of example, the imaging device 2 may be a dedicated camera, a web cam or a smartphone having a camera incorporated therein.

The apparatus 1 also comprises a processing unit 3. Such processing unit 3 is particularly put in signal communication with the imaging device 2. Furthermore, the processing unit 3 is designed to receive the above mentioned first signal "IM". The processing unit 3 analyzes the first signal "IM", processes it and outputs a second signal "EL" representative of a processed image. Further details on the architecture and operation of the processing unit 3 will be provided hereinbelow.

The apparatus 1 further comprises an image projection device 4, which is in signal communication with the processing unit 3. Particularly, the image projection devices 4 is configured to receive the aforementioned second signal "EL", which encodes the image processed by the processing unit, and projects it on the area A. For example, the image projection devices may be a commercially available video projector.

Figure 2:
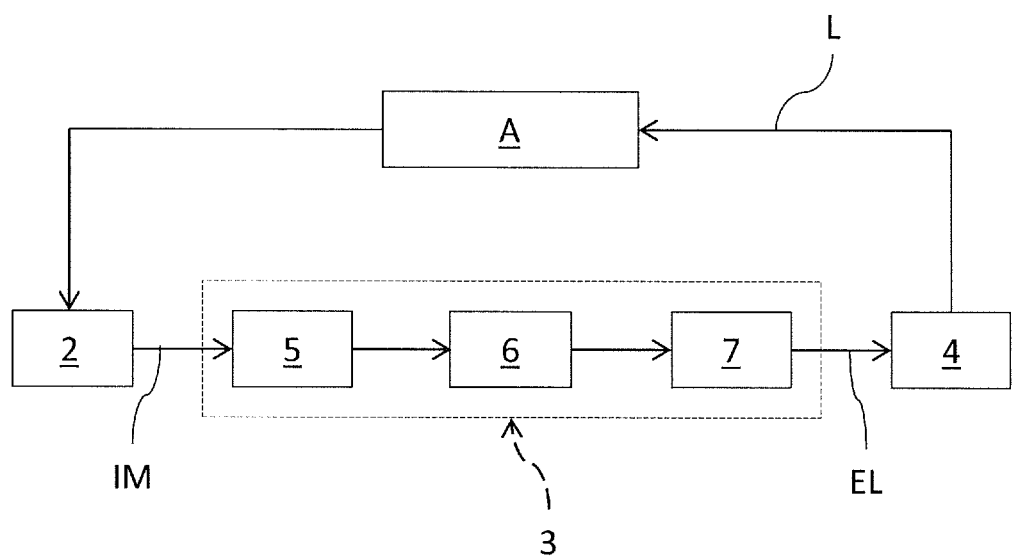
FIG. 2 shows a block diagram which illustrates the operation of the apparatus of FIG. 1.

Particularly referring to FIG. 2, the operation of the processing unit 3 of the present invention will be now described in further detail. For completeness and ease of description, the processing unit 3 will be described by dividing it into a plurality of functional modules.

Nevertheless, this shall in no way be construed as a limitation to the structure of the processing unit 3. The processing unit 3 may have any type of structure suitable for the purpose such as, by way of example only, one or more dedicated hardware devices, one or more software libraries or applications, one or more virtual machines or any combination of these elements or others. The various parts that form the processing unit 3 may be all implemented on a single platform or may be distributed across multiple hardware components connected together by wired or wireless connection, through a local area network, via the Internet, via a virtual private network, or any combination of such connections and others.

The processing unit 3 comprises an acquisition module 5, which is directly connected to the imaging device 2, and detects the transmission of the aforementioned first signal "IM".

The processing unit 3 comprises a recognition module 6, which is adapted to process the first signal "IM" using an image recognition and edge detection algorithm. In the preferred embodiment of the invention, the recognition module 6 implements the Canny algorithm, substantially as described in "J. F. Canny—*a computational approach to edge detection—IEEE Transactions on Pattern Analysis and Machine Intelligence*, p. 679-698, 1986". By this arrangement, one or more closed shapes "F", i.e. completely delimited by closed edges, are identified in the captured image. Particularly, the processing unit 3 has such purpose.

Optionally, the processing unit 3 is configured to process the first signal "IM" to detect the texture of the zones inside the edges "B" of the identified shapes "F". This operation is particularly carried out by the recognition module 4. Advantageously, this information allows detection of the type of surface enclosed by the edge "B" (for example, in case of a painting, such detection will determine whether it is an oil on canvas). This information may be incorporated in the second signal "EL", which will also include information representative of the texture that has been detected.

The processing unit 3 also comprises a control module 7, which completes the image processing operation. Particularly, the control module 7 is designed to apply a first color inside the edge "B" of each previously identified shape "F". Similarly, a second color is applied outside the edges "B" of the shapes "F", i.e. on the side of the image outside the shapes "F". Namely, the shapes "F" are uniformly filled with the first color, whereas the external parts are uniformly filled with the second color. Thus, the processed image will only have two colors, i.e. is the first and the second color.

In the preferred embodiment of the invention, the first color is white and the second color is black. In alternative embodiments of the invention, the first and second colors may be any color as long as a good contrast is ensured therebetween. Thus, the processed image is encoded in the aforementioned second signal "EL".

Particularly referring to FIG. 1, it shall be noted that the image projection device 4 is designed to generate a light beam "L" representative of the processed image. Thus, such light beam "L" is directed to the area "A" to illuminate the previously detected objects.

According to the invention, the light beam "L" comprises lighted areas and dark areas. Particularly, the portions that have been filled with the first color in the processed image correspond to the lighted areas of the light beam "L". Likewise, the portions that have been filled with the second color in the processed image correspond to the dark areas of the light beam "L". Thus, advantageously, the image projection device (4) illuminates the interior of the edges (B) of the previously identified shapes (F). It shall be noted that, in the preferred embodiment of the invention, the light beam "L" generated by the image projection devices 4 reproduces the image produced on the area "A", thereby illuminating the objects therein and leaving the empty parts in the area "A" dark.

Optionally, the image projection device 4 is configured to detect its distance from the area "A", particularly with respect to each shape "F" identified in the captured image. The image projection device 4 is designed to adjust the illuminance of the light beam generated according to the detected distance. As used herein, the term "illuminance" is intended as the ratio of the luminous flux on a surface element to the area of the element. The term "luminous flux" is intended as the product of the luminous intensity of the light source by the solid angle of the light beam.

Optionally, the image projection device 4 is configured to adjust the illuminance of the light beam "L" generated in response to the detected texture if this information is available in the second signal "EL".

A method for illuminating objects arranged in the area "A" is described below. Particularly, the method is described in its application to the above discussed apparatus 1. In certain alternative embodiments, which form part of the present invention, the method may also be carried out without using the apparatus 1.

In an optional initialization step, the area "A" is uniformly illuminated, with a white rectangle projected over the entire area "A". Advantageously, this affords a more accurate recognition of the edges "B".

More in detail, during the initialization step the processing unit 3, and particularly the control module 7, generate a rectangular background image having a uniform white color. This background image is encoded in the second signal "EL", which is sent to the image projection device 4, which projects it on the area "A", thereby generating a uniform light beam "L", corresponding to the received image.

Now the projected image may be detected, particularly through the imaging device 2. Advantageously, the perspective distortion caused by the angle of incidence of the light beam "L" on the area "A" may be corrected.

In a first step, an image in the area "A" is captured, with the purpose of detecting the shapes "F". This operation is preferably carried out by the imaging device 2, which sends the aforementioned first signal "IM" to the processing unit 3, particularly to the acquisition module 5.

If the initialization step has been carried out, the imaging device 2 captures the image in the area "A" while it is being illuminated by the uniform light beam "L".

Then, the digitized image is processed using an image recognition and edge detection algorithm. The shapes "F" with their respective edges "B" are so defined. Preferably, this operation is carried out by the processing unit 3, particularly the recognition module 6.

Then, the first color is uniformly applied inside the edge "B" of each identified shape "F". At the same time, the second color is uniformly applied outside the edges "B". This operation is particularly carried out by the processing unit 3, more particularly by the control module 7, which generates the aforementioned second signal "EL".

Then, a light beam "L" representative of the processed image is generated. This light beam "L" is directed to the area "A", to illuminate it. This operation is preferably carried out by the image projection device 4.

Optionally, the method comprises a step of detecting the distance between the light source, preferably the image projection device 4, and each identified shape "F". Based on such distance, the illuminance of the generated light beam "L" may be adjusted.

Optionally, the texture of the zones inside the edges "B" of the identified shapes "F" may be detected, particularly to detect the type of surface to be illuminated. Thus, the illuminance of the light beam "L" may be adjusted in response to the detected texture.

Those skilled in the art will obviously appreciate that a number of changes and variants as described above may be made to fulfill particular requirements, without departure from the scope of the invention, as defined in the following claims.

The invention claimed is:

1. An apparatus for illuminating objects in an area, the apparatus comprising:
   an imaging device configured to capture an image of the area and to generate a first signal representative of the captured image, wherein the imaging device is further configured to be activated to capture the image of the area under uniform illumination of the area;
   a processing unit in signal communication with the imaging device and configured to:
      receive the first signal;
      process the first signal by an image-recognition and edge-detection algorithm to identify one or more shapes bounded by edges in an acquired image; and
      process the acquired image by uniformly filling each of the identified one or more shapes with a first color, and by uniformly filling parts of the acquired image external to the edges with a second color, to generate a second signal representative of the processed image; and
   an image projection device in signal communication with the processing unit and configured to:
      receive the second signal;
      generate a first light beam representative of the processed image; and
      direct the first light beam to the area;
   wherein in order to capture the image of the area under the uniform illumination of the area:
      the processing unit is further configured to create a preliminary image defined by a uniform solid white geometrical region;
      the image projection device is further configured to project the preliminary image defining a uniform light beam on the area; and
      the imaging device is further configured to capture the image of the area under the uniform illumination of the area using the uniform light beam.

2. The apparatus of claim 1, wherein the first light beam comprises light areas and dark areas,
   wherein portions with the first color in the processed image correspond to the light areas of the first light beam,
   wherein portions with the second color in the processed image correspond to the dark areas of the first light beam, and
   whereby the image projection device illuminates an inside of the edges of the one or more shapes so identified.

3. The apparatus of claim 1, wherein the first color is white, and
   wherein the second color is black.

4. The apparatus of claim 1, wherein the first light beam generated by the image projection device reproduces the processed image on the area.

5. The apparatus of claim 1, wherein the image projection device is further configured to:
   detect a distance between the image projection device and each of the one or more shapes identified in the captured image; and
   adjust illumination of the first light beam so generated as a function of the detected distance.

6. The apparatus of claim 1, wherein the processing unit is further configured to process the first signal to detect texture of areas inside the edges of the identified one or more shapes, the second signal comprising information representative of the detected texture, and
   wherein the image projection device is further configured to adjust illumination of the first light beam so generated according to the detected texture.

7. The apparatus of claim 1, wherein the processing unit is further configured to process images using a Canny algorithm.

8. A method of illuminating objects in an area, the method comprising:
   creating a preliminary image defined by a uniform solid white geometrical region;
   projecting the preliminary image defining a uniform light beam;
   directing the uniform light beam to the area;
   capturing an image of the area under uniform illumination;
   processing the captured image by an image-recognition and edge-detection algorithm to identify one or more shapes bounded by edges;

uniformly filling each of the identified one or more shapes with a first color, and uniformly filling parts of the captured image external to the edges with a second color, to generate a processed image;

generating a first light beam representative of the processed image; and directing the first light beam to the area.

9. The method of claim 8, wherein the first light beam comprises light areas and dark areas, wherein portions with the first color in the processed image correspond to the light areas of the first light beam, and wherein portions with the second color in the processed image correspond to the dark areas of the first light beam.

10. The method of claim 8, wherein the first color is white, and wherein the second color is black.

11. The method of claim 8, wherein the generating of the first light beam causes reproduction of the processed image on the area.

12. The method of claim 8, wherein the generating of the first light beam comprises:

detecting a distance between a source of the first light beam and each of the one or more shapes identified in the captured image; and adjusting illumination of the first light beam so generated as a function of the detected distance.

13. The method of claim 8, wherein the processing of the captured image comprises detecting texture of areas inside the edges of the one or more shapes so identified, and wherein the generating of the first light beam comprises adjusting illumination of the first light beam so generated according to the detected texture.

14. The apparatus of claim 1, wherein the first color is white.

15. The apparatus of claim 1, wherein the second color is black.

16. The method of claim 8, wherein the first color is white.

17. The method of claim 8, wherein the second color is black.

* * * * *